United States Patent
Bugnon et al.

(10) Patent No.: US 7,041,166 B2
(45) Date of Patent: *May 9, 2006

(54) MANUFACTURING AND CONDITIONING OF SOLID SOLUTION ORGANIC PIGMENTS

(75) Inventors: Philippe Bugnon, Essert (CH); Marc Maurer, Village-Neuf (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/500,949

(22) PCT Filed: Jan. 23, 2003

(86) PCT No.: PCT/EP03/00647

§ 371 (c)(1),
(2), (4) Date: Jul. 7, 2004

(87) PCT Pub. No.: WO03/064541

PCT Pub. Date: Aug. 7, 2003

(65) Prior Publication Data

US 2005/0081755 A1    Apr. 21, 2005

(30) Foreign Application Priority Data

Jan. 31, 2002  (EP)  ............... PCT/EP 02/01018
Jul. 31, 2002  (EP)  ................... 02405666

(51) Int. Cl.
   C09B 67/04     (2006.01)
   C09B 67/10     (2006.01)
   C08K 5/00      (2006.01)
   C08K 5/3415    (2006.01)

(52) U.S. Cl. .............. 106/493; 106/412; 106/494; 106/495; 106/496; 106/497; 106/498; 106/499

(58) Field of Classification Search ........... 106/410, 106/411, 412, 413, 493, 494, 495, 496, 497, 106/498, 499
See application file for complete search history.

(56) References Cited

U.S. PATENT DOCUMENTS

| | | | |
|---|---|---|---|
| 3,287,147 A | 11/1966 | Wilkinson | 106/288 |
| 3,554,776 A | 1/1971 | Gerson et al. | 106/288 |
| 4,094,699 A | 6/1978 | Fitzgerald | 106/288 |
| 4,522,654 A | 6/1985 | Chisvette et al. | 106/288 |
| 4,783,540 A | 11/1988 | Bäbler | 548/453 |
| 4,810,304 A | 3/1989 | Jaffe et al. | 106/494 |
| 5,318,627 A | 6/1994 | Dietz et al. | 106/498 |
| 5,492,563 A | 2/1996 | Urban | 106/412 |
| 5,614,014 A | 3/1997 | Urban | 106/495 |
| 5,641,351 A | 6/1997 | Bäbler | 106/495 |
| 5,756,746 A | 5/1998 | Hao et al. | 546/56 |
| 5,800,607 A | 9/1998 | Schnaitmann et al. | 106/412 |
| 6,174,361 B1 | 1/2001 | Urban et al. | 106/498 |
| 6,494,947 B1 | 12/2002 | Hauser et al. | 106/495 |
| 6,544,325 B1 | 4/2003 | Hall-Goulle et al. | 106/410 |
| 6,890,380 B1 * | 5/2005 | Giger et al. | 106/493 |

FOREIGN PATENT DOCUMENTS

| | | |
|---|---|---|
| DE | 3446177 | 7/1985 |
| DE | 19618056 | 1/1997 |
| EP | 0101163 | 2/1984 |
| EP | 0277914 | 8/1988 |
| EP | 0504923 | 9/1992 |
| EP | 0524904 | 1/1993 |
| EP | 0678558 | 10/1995 |
| EP | 0979846 | 2/2000 |
| JP | 2001154387 | 6/2001 |
| WO | 02/068541 | 9/2002 |

OTHER PUBLICATIONS

Chem. Abstr. 135:26837 for JP 2001154387 (Jun. 2001).
Patent Abstracts of Japan Publication No. 2001-154387 (Jun. 2001).

* cited by examiner

Primary Examiner—Anthony J. Green
(74) Attorney, Agent, or Firm—Joseph C. Suhadolnik

(57) ABSTRACT

Organic solid solution pigments are prepared and conditioned by treating a mixture of their components, after synthesis but preferably without or with only partial drying, in a mixture of from 0 to 30% by weight of an organic liquid having a dipole moment $\mu$ of $2.8–6.0 \cdot 10^{-18}$ .esu (2.8 to 6.0 debye units) and from 70 to 100% by weight of water in an agitated media pearl mill having a specific power density of at most $2.0 \text{ kj} \cdot \text{s}^{-1}$ per liter of grinding space. Drying the starting components is especially suitable in the case of only slightly agglomerating, easy to wet pigments of specific surface area from 1 to 25 $m^2/g$. The method gives excellent results, and is flexible and also much simpler than known methods.

35 Claims, No Drawings

MANUFACTURING AND CONDITIONING OF SOLID SOLUTION ORGANIC PIGMENTS

The invention relates to a simplified, economical and environmentally friendly method of preparing and conditioning solid solutions and mixed crystals of organic polycyclic pigments, especially quinacridones and diketopyrrolopyrroles. The coloristic properties of the solid solution pigments obtained are significantly improved and much better than in the case of existing simple methods, while the use of known methods that are more complicated, more costly or problematic can advantageously be avoided.

Pigments are generally obtained from synthesis in a form that is not suited, or is only poorly suited, to most applications. It is therefore customary for the crude pigments to be subjected to conditioning. In the course of time it has also been found that most conditioning methods are highly specific and can be used only for individual pigment classes or even only for individual pigments, giving rise, therefore, to virtually countless methods, which have been disclosed in a very large number of patent applications and patents.

In such methods, the same basic principles are always applied: the crude pigments are dissolved and re-precipitated from the solution, ground (where appropriate, with the aid of grinding elements), or treated with water or solvents (where appropriate, at elevated temperature). These methods are generally combined with one another and, where appropriate, supplemented by additional process measures having different purposes, for example the addition of acids, bases and/or additives, giving rise to the many known variants.

The patents and patent applications which are considered in detail in WO-02/068541 (published after the instant application's priority date) appear representative of those existing general methods, for example those described in EP-A-0 524 904, EP-B-0 737 723, EP-A-0 971 001, JP-A-54/130621, JP-A-58/147461, U.S. Pat. Nos. 2,857,400, 3,017,414, 3,256,285, 3,615,800, 4,024,148, 4,247,696, 4,431,806, 4,734,137, 4,895,948, 4,895,949, 4,922,101, 5,264,034, 5,318,627, 5,428,136, 5,492,563, 5,565,578, 5,614,014, 5,756,691, 6,191,263 and WO-A-99/54410.

Often, pigments are first dissolved to produce clear solutions, for example in concentrated sulfuric acid or a highly polar solvent such as dimethylformamide, dimethyl sulfoxide or N-methylpyrrolidone with the addition of a small amount of a strong alkali (at most 20% water, based on the liquid phase). The solution of colorant is then diluted with dilute acid, water or an alcohol or is added thereto, the crystalline form obtained being critically dependent upon the precise precipitation conditions. For example, diketopyrrolopyrroles, perylenes and quinacridones can be treated in that manner. The pigments may also be dissolved only in part (Ostwald ripening).

However, such recrystallisation methods promote the growth of pure crystals and/or phase changes, so that they are only exceptionally suitable in the case of solid solutions and mixed crystals, which have a fine-tuned crystal lattice easily disturbed through conditioning.

According to U.S. Pat. No. 4,094,699, organic liquids need not be used during wet grinding of quinacridones if a wetting agent together with a strongly alkaline aqueous solution is used. No solid solution is mentioned.

U.S. Pat. No. 3,287,147 discloses the formation of mixed crystals of quinacridones by acid pasting the mixture of the components followed by heating a neutral aqueous slurry of the product at from 150 to 300° C., preferably 220 to 270° C. for 12 to 36 hours in an autoclave and extraction with sulfuric acid to remove traces of iron.

U.S. Pat. No. 4,783,540 describes how, starting from a physical mixture of two different 1,4-diketo-2,5-dihydropyrrolo[3,4c]pyrroles, it is possible to obtain solid solutions by kneading, grinding, reprecipitating or contacting the mixture with polar solvents. U.S. Pat. No. 4,810,304 discloses the same methods to prepare mixed diketopyrrolopyrrole/-quinacridone solid solutions, which are optionally conditioned in n-butanol.

The X-ray diffraction diagrams of these solid solutions are in both cases different from the sum of the X-ray diffraction diagrams of the individual components. In all of the products obtainable in accordance with the disclosed examples, however, they are also markedly different from the X-ray diffraction diagrams of the pure crystalline individual components. The solutions involved, therefore, are exclusively multiphase solid solutions, which have no definite, uniform crystal lattice such as in a mixed crystal of uniform crystal lattice or a single-phase solid solution wherein the guest entirely disappears into the host's crystal lattice. Moreover, these products are with few exceptions obtained in an undesirable, largely amorphous form.

Example 11 of U.S. Pat. No. 5,194,088 discloses a process for the preparation of a solid solution of 1,4-diketo-2,5-dihydro-3,6-di(4-chlorophenyl)-pyrrolo[3,4c]pyrrole and 2,9-dichloroquinacridone consisting of premilling the mixture of crude pigments and then growing crystals by heating in N,N-dimethylformamide.

An analogous method is used in DE-OS 1 810 817 to produce solid solutions of perylenes from very fine dispersions. In the examples, preliminary comminution is performed by coprecipitation or preferably by mixed synthesis.

EP-A-0 101 163 discloses a process for the preparation of finished solid solution quinacridone pigments from crude precursors by two-step milling, first dry then with a basic aqueous solution comprising from 5 to 25% by weight of an organic liquid. This process is very slow.

U.S. Pat. No. 5,756,746 discloses single-phase solid solutions of diketopyrrolopyrroles or diketopyrrolopyrroles/quinacridones, obtained preferably but in unsatisfactory low yields through alcaline reprecipitation or from mixtures of pigment precursors. The other disclosed but not exemplified methods of U.S. Pat. No. 4,783,540 and U.S. Pat. No. 4,810,304 are manifestly less satisfactory.

JP-A-2001/154387 and WO-02/04563 disclose solid solutions, respectively mixed crystals, comprising as guests some of the instant pigments. In both cases, the main component (host) is a phthalocyanine, but the guests are from different pigment classes.

All these methods are, for various reasons, not entirely satisfactory; moreover, such methods can be transferred from one pigment to another only with difficulty and sometimes fail entirely to form solid solutions, as disclosed in EP-0 737 723 and WO-00/56819. In the case of multifunctional pigment plants, that results in high investment costs, a high personnel requirement, a lack of operational flexibility and extremely complex and costly quality assurance measures. The use of strong acids and high boiling point polar solvents in high quantities is problematic and their disposal or recycling is costly, too.

Some of those problems can be avoided in certain cases by subjecting the dry crude pigments to salt kneading in a separate system with the addition of a small amount of solvent. The procedure is, however, slow, noisy and very energy-consuming, and it is not applicable to all sought solid solutions and mixed crystals. In addition, because of the very high frictional energy, it is necessary to monitor continuously the temperature (with a great deal of cooling) and the viscosity of the paste and, subsequently, solvent-containing brine must be disposed of in an environmentally friendly manner. In addition, further purification steps are necessary to achieve the low conductivity required, for example, for electronic applications, and a preliminary amorphisation of one component may be necessary as disclosed in WO-02/04563.

There has now been found, surprisingly, a simple combined preparation and conditioning method which can be used for a large choice of organic solid solution pigments and which ensures a very high quality of final product together with a considerable increase in productivity.

The invention accordingly relates to a method for the preparation of a conditioned organic pigment comprising at least a first component selected from the group consisting of 4,4'-diamino-1, 1'-dianthraquinonyls, diketopyrrolo[3,4-c]pyrroles, triphenedioxazines, indanthrones, perylenes, phthalocyanines and quinacridones, and a second component forming a solid solution or a mixed crystal with the first component, the molar ratio of the first component to the second component in the solid solution or mixed crystal being greater or equal to 1, wherein (1) the first component and the second component are each independently from the other so synthesised that they precipitate from a liquid reaction mixture, and a pigment suspension is formed in the liquid reaction medium;

(2) optionally, the concentration of pigment in one or both pigment suspensions from step (1) is increased by removing all or part of the liquid reaction medium;

(3) optionally, a washing agent is added once or more than once and then the concentration of pigment in one or both pigment suspensions from step (1) or (2) is increased by removing all or part of the liquid phase;

(4) optionally, the pigment suspension is dried;

(5) the pigment suspensions from step (1), the concentrated pigment suspensions from step (2), or the pigment suspensions (treated with a washing agent and concentrated) from step (3), the liquid phases of which consist substantially of water, an organic liquid or a mixture thereof, or the dried pigments from step (4) are each transferred into a storage vessel or both transferred into the same storage vessel, optionally with addition of water or an organic liquid, preferably keeping the pigment surface substantially wetted with liquid reaction medium, washing agent, organic liquid or water all the time;

(6) if the liquid phase of the pigment suspension in one or both storage vessels does not already consist of water and optionally an organic liquid, the amount of organic liquid being from 0 to 50% by weight, based on the total amount of organic liquid and water, the composition of the pigment suspension is so modified by means of the addition of water that the amount of organic liquid is from 0 to 50% by weight, based on the total amount of organic liquid and water; and/or optionally organic liquid is added in such quantity that its total amount does not excede 50% by weight, based on the total amount of organic liquid and water;

(7) the pigment suspension from the storage vessel containing the first component and if applicable the pigment suspension from the storage vessel containing the second component are passed a number of times through an agitated media pearl mill in a circulating or shuttle mode of operation, the agitated media pearl mill having a smaller chamber volume than the volume of the pigment suspension and being operated at a specific power density of at most 2.0 kj·s$^{-1}$ per liter of grinding space, whereby in case of more than one storage vessel the flow between the storage vessels and the pearl mill is controlled in such a way that the contents of all storage vessels are mixed together at any stage up to before the last pass in the pearl mill; whereby the first component and the second component combine to form a solid solution or a mixed crystal;

(8) optionally, the concentration of pigment in the pigment suspension from the agitated media pearl mill is increased by removing all or part of the liquid reaction medium;

(9) optionally, a washing agent is added once or more than once to the pigment suspension from step (7) or (8) and then the concentration of pigment in the pigment suspension is increased by removing all or part of the liquid phase; and

(10) optionally, the pigment is isolated by removing the liquid surrounding it.

Step (1) corresponds to pigment synthesis known per se to the person skilled in the art but stopped at the point where the reaction is complete. Subsequent maturation may optionally be carried out, for example in order to increase filterability, but that should be carried out under mild conditions so that the pigment particles do not become too large. Generally, the average size of non-agglomerated primary particles, viewed with an electron microscope, should be from 0.01 to 3 µm, preferably from 0.05 to 2 µm. It is generally much preferable that the pigment particles are not dried; otherwise, they aggregate and the desired result cannot be achieved or is achieved too slowly.

Although not desirable, it is nevertheless possible to use a dried pigment, or to perform step (4), in particular in the case of very coarse pigments that have only a very slight tendency to aggregate and are easy to wet with water or a polar solvent, for example crude pigments having a specific surface area of from 1 to 25 m$^2$/g, especially from 2 to 15 m$^2$/g. Dried pigments preferably still comprise a residual amount of water or an organic liquid, for example from 0.1 to 20% by weight, most preferably from 1 to 10% by weight. Apart of the additional drying and wetting steps, however, this procedure is in all particulars similar to that described above and the same preferences do apply.

Increasing the concentration of pigment in the pigment suspension in steps (2), (3), (8) and/or (9) can be carried out by methods known per se, for example filtration, dialysis or sedimentation with removal of liquid from the clear phase, optionally under increased gravity. 'Part' is to be understood as an amount of from 1 to 99% by weight, usually from 1 to about 90% by weight.

Washing agents suitable for step (3) are known to the person skilled in the art from the relevant synthesis methods for the pigment used. They are, for example, water, brine, bicarbonate solution or any desired organic solvent, alone or in admixture or in any desired order. The purpose of such washing is to remove unreacted starting materials, reagents and by-products, especially acids, bases and coloured impurities. If filtration is used in step (2), it is especially efficient and advantageous to rinse the wet filter cake with washing agent. It is of course also possible first to redisperse the filter cake in the washing agent and only then to filter again.

The pigment suspension can be transferred to the storage vessel by methods known per se, which will depend on the consistency of the pigment suspension. A low-viscosity pigment suspension can, for example, be pumped, a solid press cake can be transferred by scooping or tipping, and a viscous paste by flushing with water or solvent. A particular aspect of the invention relates to transferring the pigment suspension in the form of a press cake consisting of from 10 to 50% by weight pigment and from 50 to 90% by weight liquid, preferably from 20 to 40% by weight pigment and from 60 to 80% by weight liquid. In that case the liquid is an organic liquid, water or a mixture thereof, preferably water.

Of course, steps (2), (3) and (4) can be performed or omitted for each component entirely independently from their realization or omission for the other components.

Step (6) specifies suitably modifying, when necessary, the ratio of water to organic liquid before passage through the agitated media pearl mill. If an organic liquid is added in step (6), that is carried out preferably before step (7) is started. It is also, however, perfectly possible to add all or some of the organic liquid to the pigment suspension only after one or more passes through the agitated media pearl mill, although the treatment time will be needlessly extended as a result. However, the instant ratio of water to the total quantity of organic liquid must be respected.

The treatment of the pigment suspension in the agitated media pearl mill is the essential step of the invention. Surprisingly, step (7) leads to formation of solid solutions or mixed crystals in a much easier and better way, as compared with prior art methods. Suitably, the single components of the solid solution to be formed can be mixed at any stage of this step, for example already before or just at the beginning or after a few passes, but a homogeneous mixture should of course be achieved no later than before the last pass, preferably before the last third of the total grinding time. Means of mixing are for example stirring, pumping or pouring from one storage vessel to another of different contents, inlet from the pearl mill to a storage vessel of different contents or simultaneous inlet from storage vessels of different contents to the pearl mill in any volume ratio. However, it is also possible first to pass the suspensions from one or more of the storage vessels any number of times separately through the pearl mill before mixing them. This provides an opportunity to optimize particle size and shape of the different components before the preparation of solid solutions or mixed crystals is started, leading to outstanding and highly reproducible results.

The friction should preferably not be too high; otherwise, pigment particles that are obtained will be too small as a result of the grinding action. Conversely, the speed should preferably not be too low; otherwise, the dispersive force will be insufficient to separate any agglomerations present into their primary particles. For excellent results, it has been found that the specific power density should be at most 2.0 $kj \cdot s^{-1}$ per liter of grinding space and the peripheral speed of the agitator should then be from 5 to 12 $m \cdot s^{-1}$, preferably from 6 to 11 $m \cdot s^{-1}$. Higher peripheral speeds of up to about 15 $m \cdot s^{-1}$ (perhaps even higher in the future) are possible with some special apparatus, but only if achievable at a specific power density of at most 2.0 $kj \cdot s^{-1}$ per liter of grinding space.

The temperature is advantageously in the range between the freezing point and the boiling point of the mixture of water and organic liquid, preferably from 10 to 120° C., especially from 60 to 100° C. or also from 100 to 120° C. under excess pressure. The temperature is advantageously adjusted in the storage vessel. An especially preferred aspect of the invention, however, relates to starting step (7) at a temperature of from 10 to 50° C., preferably from 15 to 45° C., then optionally to rise the temperature (at once, gradually, or in steps) in the course of grinding to a value of from 30 to 100° C., preferably from 50 to 100° C. at the end of step (7). Temperature control can be achieved especially conveniently in the temperature range from 30 to 100° C., because the heat of friction can be balanced, approximately, by the heat losses. Above that range, it is necessary to carry out heating. After the solid solution or mixed crystal has been formed, it is optionally also possible to ripen it outside the pearl mill. It is also possible to decrease the temperature as disclosed in WO-02/068541.

The agitated media pearl mill is a known apparatus, it merely being adequate to use a controller so that, at full power, it does not exceed the above-mentioned specific power density. Whilst taking that precaution, it is possible to use any desired apparatus, without requiring any special constructional measures because the heat of friction is not very great. In other regards, the operating instructions of the available apparatus should be consulted. As grinding elements there are used, for example, balls of from 0.1 to 1 mm in diameter made from zirconium oxide, mixed zirconium oxide, aluminium oxide, quartz or a metal such as steel, preferably mixed zirconium oxide balls having a diameter of from 0.2 to 0.3 mm.

The total treatment period in the agitated media pearl mill is usually from 10 to 600 minutes, preferably from 20 to 200 minutes (including dwell time in the storage vessel between individual passes), a longer treatment period such as up to 10000 minutes having no significant effect on the properties of the product. As a result, the risk of overmilling can be excluded, with very great advantage for the meeting of specifications, especially if it is ensured that the radial speed of the mill is not too high; in the final phase of grinding (approximately the last third of the total grinding time), the radial speed should be cut back to a value of at most 11 $m \cdot s^{-1}$, preferably from 1 to 8 $m \cdot s^{-1}$, especially from 2 to 5 $m \cdot s^{-1}$.

In the case of a shuttle mode of operation, a plurality of storage vessels is used, for example from 2 to 20 storage vessels, the suspension being passed from one storage vessel to another storage vessel via the agitated media pearl mill. The flow between the different parts of the equipment can be kept constant, or it can changed once or more times, manually or automatically or preferably by computer control, it being easy to use for example thermostats, digital thermometers, flowmeters, level alarms and/or optical devices to monitor the process and the formation of the desired solid solution. Computer control may encompass step (7) or any number of further instant process steps, up to the whole process including the manufacture of the first and second components. Computer control may be interrupted or assisted by manual operation at critical stages.

Passing pigment suspension through a number of times in a circulating or shuttle mode of operation is understood to mean that the volume passed through is at least twice as great as the volume of the pigment suspension, which in the shuttle mode of operation corresponds to passing through approximately twice. The maximum value is arbitrary, although the use of more than one hundred passes, for example one thousand passes, whilst possible, is of little advantage because it has no significant effect on the properties of the product. Circulating and shuttle modes of operation can also be used in alternance or combined with one another, for example grinding first in a circulating mode of operation and then in a shuttle mode of operation and vice versa.

In principle, the washing agents used in step (9) can be the same as in step (3). Because the conditioning according to the invention is carried out substantially under neutral conditions, it is necessary to remove, at most, very small amounts of acid or base. Moreover, once step (3) has been carried out, most of the unreacted starting materials, reagents and by-products will already have been removed so that smaller amounts of polar solvents, for example alcohols and, preferably, water, can be used for the washing.

Isolation of the pigment is carried out by any desired known method. For example, it is possible to carry out filtration or centrifugation and then to dry the moist material in an oven or fluidised-bed apparatus (for example at from 50 to 250° C., optionally in vacuo), or to freeze-dry it. It is likewise possible to spray-dry the pigment suspension directly. The conditioned pigment is usually obtained in the form of a powder, which can, if desired, be dry-ground and sieved or treated by any other desired physical method. However, it is perfectly possible to store or use it as a wet filter cake, for example for manufacturing water-based masterbatches or coating compositions.

The organic liquid can for example be an alcohol, glycol, ether, amine, ketone, or an aliphatic or aromatic hydrocarbon; the organic liquid is preferably neutral and comprises oxygen in its molecule, most preferably it is a polar organic liquid having a dipole moment $\mu$ of $2.8-6.0 \cdot 10^{-18}$ esu. Neutral organic liquids are such having a $pK_a$, respectively $pK_b$, of about 5.5–8.5. The polar liquid advantageously has a dipole moment $\mu$ of $2.8-6.0 \cdot 10^{-18}$ esu (from 2.8 to 6.0 debye units), measured in benzene at 25° C., preferably $3.3-5.5 \cdot 10^{-18}$ esu, especially $3.8-5.0 \cdot 10^{-18}$ esu. The liquid sho also be inert with respect to the pigment and to water at temperatures up to 100° C. and also, in the concentration used and in the temperature range used, should dissolve in water to give a clear solution, although that is virtually always the case.

Suitable liquids are, for example, methanol, ethanol, n-propanol, isopropanol, n-butanol, isobutanol, 2-butanol, tert.-butanol or any isomer of $C_6$–$C_8$ alcohols, acetone, ethylmethylketone, cyclohexanone.

Most suitable neutral polar liquids are, for example, acetamide, formamide, methyl-acetamide, methylformamide, caprolactam, valerolactam, 1,1,2,2-tetramethylurea, dimethyl sulfoxide, sulfolane, nitromethane, nitrobenzene, acetonitrile, methanol, ethylene carbonate, dimethylacetamide, dimethylformamide and N-methylpyrrolidone, preferably dimethyl sulfoxide (DMSO), dimethylformamide (DMF) or N-methylpyrrolidone (NMP), especially N-methylpyrrolidone.

Of course, slight molecular modifications of the above-mentioned liquids are possible (for example, replacement of methyl groups by ethyl groups) provided that their polarity remains suitable as a result. Optionally, it is also possible to use mixtures of a plurality of organic liquids, the overall polarity of which lies in the range of $2.8-6.0 \cdot 10^{-18}$ esu, as a replacement for an organic liquid having a polarity in the same range (the overall polarity of a mixture of polar liquids, where applicable, should be calculated from the dipole moments of the components in proportion to the relative amounts thereof in the mixture).

The expression "liquid" is used herein because the pigments are, under neutral conditions, poorly soluble therein and therefore the usual term "solvent" would be functionally incorrect.

The amount of organic liquid in step (6) is advantageously from 0 to 30% by weight, based on the total amount of organic liquid and water. Preferably, there is no organic liquid or the amount of organic liquid is from 1 to 30% by weight, based on the total amount of organic liquid and water. Mixtures of organic liquids and water preferably form a homogeneous phase, but this is not necessarily required provided that an aqueous phase is present (in the case of multiple liquid phases, the instant definitions and preferences shall always apply to the aqueous phase, other phases containing no or less water shall be considered as additional).

Preference is generally given to an amount of organic liquid of from 3 to 20% by weight, especially from 5 to 10% by weight, based on the total amount of organic liquid and water. However, a particularly preferred embodiment of the invention is to use from 0 to 3% by weight of liquid, based on the total amount of organic liquid and water. It is highly surprising that the instant process works in the presence of only a very small amount of organic liquid or even in its total absence. When use in such low amount, the organic liquid is adequately polar, otherwise its presence will hardly have any influence on the process, as compared with plain water.

In addition, it is possible to use small amounts of additional substances, for example acids, bases, resins, growth inhibitors, phase directors and, especially, viscosity improvers, dispersing agents and/or wetting agents. The amount of acid or base should, however, be at most 0.01 mol, especially at most 0.001 mol, based on 1 mol of water. In the absence or presence of only a small amount of organic liquid, the process is preferably operated in the presence of a small amount of base, most preferred at a pH in the range of from 9 to 11, especially at a pH of about 10. Resins (for example rosin, rosin derivatives, fatty amines or polyacrylates) are added in amounts of up to, at most, 10% by weight, preferably at most 5% by weight, especially 1% by weight, based on the pigment. Growth inhibitors, phase directors, viscosity improvers and dispersing agents are known to the person skilled in the art and may be, for example, substances having structural elements of the pigment; they are usually used in amounts of at most 0.2 mol, preferably at most 0.1 mol, most preferred at most 0.03 mol, based on 1 mol of pigment. Wetting agents, for example cationic, anionic, amphoteric or non-ionic wetting agents, can likewise be added in customary amounts. Preference is given, in that case, to the addition of from 0.2 to 5% by weight, especially from 0.5 to 3% by weight, based on the pigment, of an amphoteric wetting agent. Additional substances in general can suitably be added in any step (1), (2), (3), (5), (6), (7), (8) or (9), preferably in step (7), (8) or (9), with particular preference in step (7), especially after two-third of the total duration of step (7). However, it is preferred to add phase directors before or in an early stage of step (7), and growth inhibitors as well as viscosity improvers after or in a late stage of step (7), at which time it is also most adequate, if desired, to perform any usual surface treatment to improve rheology, dispersibility and/or other applicatory properties. Early and late stage can be understood to be the first, respectively the last third of the total grinding time, preferably the first, respectively the last fifth of the total grinding time.

A major advantage of the invention is that no solid salts are necessary. Although it is possible to add salts (for example sodium chloride or sodium sulfate) up to the saturation limit in the aqueous liquid, that does not bring about any advantages but, on the contrary, only gives rise to additional problems in recovering the liquid.

The method can be performed in the presence of air. In the case of oxidisable pigments, for example quinacridones, it is, however, advantageously possible, if desired, to create inert conditions very simply using nitrogen, carbon dioxide or a noble gas.

It is self-evident that, for the purpose of recycling, the organic liquid used can be recovered by methods known per se, for example by distillation. Dilute aqueous solutions of organic liquids are conveniently disposed of for example by wet oxidation.

In contrast to other conditioning methods, for example kneading, the viscosity plays a rather subordinate role. It is necessary, however, to select a viscosity range that is suitable for the apparatus used, for example from $5 \cdot 10^{-2}$ Pa·s to 5 Pa·s, preferably from $10^{-1}$ Pa·s to $5 \cdot 10^{-1}$ Pa·s (at 500 s$^{-1}$). The person skilled in the art will know, or can determine by simple means known to him, how the viscosity depends upon the temperature, the liquid selected and the concentration thereof, and upon the concentration and particle shape of the pigment being conditioned.

The amount of crude pigments is usually, in step (7), from 1 to 25% by weight, preferably from 2 to 20% by weight, especially from 5 to 15% by weight, based on the total amount of crude pigments, liquid and water (including water or liquid in the press cake), it being necessary of course for the amount of crude pigments to be calculated from the crude pigment content of the press cakes when the press cakes are not dried. The amount of crude pigment in a press cake is usually from 10 to 50% by weight, preferably from 20 to 40% by weight, based on the wet press cake.

The first component and the second component of the instant solid solutions can be individual chemical compounds, mixtures of a plurality of chemical compounds or even solid solutions or mixed crystals comprising a plurality of chemical compounds, preferably quinacridones and/or diketopyrrolopyrroles, optionally in combination with derivatives thereof. Of course, the solid solutions or mixed crystals used as components are different from the solid solutions or mixed crystals instantly to be produced in that they lack the other instant component or comprise a different amount of it. For example, it is possible to produce a ternary solid solution from a binary solid solution and a single component, or a mixed crystal may be made from a solid solution and an additional amount of one of its components, thus adjusting the molar ratio precisely to the value required by the mixed crystal's lattice (or vice versa). Of course, the solid solutions or mixed crystals made by the instant process may themselves also be used as components for making further solid solutions or mixed crystals.

Additionally to the first component and the second component, it is optionally also possible to use further components to be incorporated into the instant solid solution as well, for example a third, or also a fourth and even a fifth component. These components are then also included in step (7) and preferably in steps (1) to (6), too. Usually, solid solutions have no more than five components so that it will not be necessary to use more than five components, but the invention clearly also encompasses the production of solid solutions or mixed crystals having an unlimited number of components. It is adequate both to mix all the components together simultaneously or in sequence, the latter procedure being especially useful when the number of components exceeds the number of available vessels or when it is intended to mix the components by manual control.

In the selection of components and the amounts thereof, the person skilled in the art will take as target solid solutions or mixed crystals that are known per se or to be expected on the basis of the state of the art and use components which are known and easily accessible, but not necessarily having excellent pigmentary properties.

The shuttle mode of operation is especially well suited. The number of storage vessels is, in such a case, preferably one more than the number of components, which makes it possible for the treatment period to be matched to the characteristics of the different components and the solid solution or mixed crystal to be obtained. The person skilled in the art will immediately recognise the great advantages of this method.

The second component of the instant solid solutions is, for example, from the 1-aminoanthraquinone, anthanthrone, anthrapyrimidine, azo, azomethine, dioxazine, diketopyrrolopyrrole, flavanthrone, indanthrone, isoindoline, isoindolinone, isoviolanthrone, perinone, perylene, phthalocyanine, pyranthrone, quinacridone, quinacridonequinone, quinophthalone or thioindigo series, optionally also in the form of metal complexes or metal lakes. The second component is preferably also selected from the group consisting of 4,4'-diamino-1,1'-dianthraquinonyls, diketopyrrolo[3,4-c]pyrroles, triphenedioxazines, indanthrones, perylenes, phthalocyanines and quinacridones, most preferably of the same member of this group, as the first component.

Solid solution pigments obtainable according to the invention comprise as individual components, for example, Colour Index Pigment Yellow 24, 108, 109, 110, 123, 147, 173, 193, 199, Pigment Orange 40, 43, 48, 49, 51, 61, 71, 73, Pigment Red 88, 89, 122, 149, 168, 177, 178, 179, 181, 190, 192, 194, 202, 204, 206, 207, 209, 216, 224, 226, 254, 255, 262, 264, 270, 272, Pigment Violet 19, 23, 29, 31, 37, 42, Pigment Blue 15, 15:1, 15:2, 15:3, 15:4, 15:6, 16, 60, 64, Pigment Green 7, 36, Pigment Black 31, 32, Vat Red 74, 3,6-di(3'-cyano-phenyl)-2,5-dihydro-pyrrolo-[3,4-c]pyrrole-1,4-dione or 3-phenyl-6-(4'-tert-butyl-phenyl)-2,5-dihydro-pyrrolo-[3,4-c]pyrrole-1,4-dione, of which preferably those selected from the group consisting of 4,4'-diamino-1,1'-dianthraquinonyls, diketopyrrolo[3,4-c]pyrroles, triphenedioxazines, indanthrones, perylenes, phthalocyanines and quinacridones.

Special preference is given to polycyclic components, including, especially, quinacridones, perylenes and diketopyrrolopyrroles, very especially quinacridones preferably being prepared by oxidation of dihydroquinacridones using hydrogen peroxide, for example as described in U.S. Pat. No. 5,840,901 or U.S. Application 60/277,824.

The instant method is especially excellent to prepare solid solutions comprising as components two quinacridones or a quinacridone and a diketopyrrolo[3,4-c]pyrrole, preferably comprising unsubstituted quinacridone and 2,9-dichloroquinacridone, unsubstituted quinacridone and 3,6-diphenyl-2,5-dihydro-pyrrolo[3,4-c]pyrrole-1,4-dione, unsubstituted quinacridone and 3,6-di(4'-chloro-phenyl)-2,5-dihydro-pyrrolo[3,4-c]pyrrole-1,4-dione, 2,9-dichloroquinacridone and 3,6-diphenyl-2,5-dihydro-pyrrolo[3,4-c]pyrrole-1,4-dione, 2,9-dichloroquinacridone and 3,6-di(4'-chloro-phenyl)-2,5-dihydro-pyrrolo[3,4-c]pyrrole-1,4-dione or 3,6-diphenyl-2,5-dihydro-pyrrolo[3,4-c]pyrrole-1,4-dione and 3,6-di(4'-chloro-phenyl)-2,5-dihydro-pyrrolo[3,4-c]pyrrole-1,4-dione, most preferred comprising unsubstituted quinacridone and 2,9-dichloroquinacridone, unsubstituted quinacridone and 3,6-diphenyl-2,5-dihydro-pyrrolo[3,4-c]pyrrole-1,4-dione or 2,9-dichloroquinacridone and 3,6-di(4'-chloro-phenyl)-2,5-dihydro-pyrrolo[3,4-c]pyrrole-1,4-dione.

The solid solution pigments obtained in accordance with the invention have a high degree of crystallinity and optimum fastness properties, as well as high colour strength and colour saturation. Moreover, the particle size distribution is astonishingly narrow. In the case of the preferred average particle size of the conditioned pigment $\overline{L}$ of preferably from 0.01 to 3 μm, especially from 0.05 to 2 μm, at least 90% by weight of particles have a size of $\overline{L} \pm \frac{1}{2}\overline{L}$ (for example, in the case of an average particle size of 0.2 µm, 0.2±0.1 µm=0.1 to 0.3 µm). Especially, at least 80% by weight of particles have a size of $\overline{L}\pm\frac{1}{4}\overline{L}$.

Solid solutions and mixed crystals are easily identifiable from physical mixtures of their components by their X-ray powder diagrams. Preference is given to carrying out the method at least until the pigment consists of a single uniform crystalline phase (solid solution or mixed crystal) or at least one component can essentially no more be identified on the X-ray powder diagram.

The pigments obtained according to the invention can be used for all customary purposes, for example for mass-coloration of polymers, including polymers in the form of fibres, surface-coatings (including special-effect paints, including those for the automobile sector) and printing inks, or also in so-called resists or as toners. Such applications will be so evident to the person skilled in the art that they need not be listed here. They are also disclosed in reference works, for example "Industrielle Organische Pigmente" (W. Herbst+K. Hunger, VCH Weinheim/New York, new editions being continually published in German and English).

It is also advantageously possible to prepare both transparent and hiding forms. Especially advantageous is the preparation of hiding pigments. The hiding power is suitably measured in a 25±5 µm thick acrylic or polyester enamel coating system having a pigment to binder weight ratio of 0.18 over a black and white background and prepared and measured according to established industry procedures such as disclosed in Example 10. For a hiding pigment, the color difference ΔE* measured over a black and white background should be less or equal to 15, preferably ≦10, most preferably ≦5.

Transparent pigments generally have a particle size (length) of 0.001–0.3 µm, preferably 0.01–0.2 µm, most preferably combined with the narrow particle size distribution mentioned above. In the same coating as above, the color difference ΔE* measured over a black background is advantageously less or equal to 15, preferably ≦10, most preferably ≦5, as compared with the color of the black background itself.

It has furthermore been found, that pigments prepared in accordance with the invention are of such outstanding quality that they may frequently come into consideration for applications where the qualities obtainable hitherto for the same solid solution pigment have not been entirely satisfactory. The person skilled in the art is here expressly recommended to carry out appropriate experiments.

The Examples that follow illustrate the invention, without limiting the scope thereof (unless otherwise specified, "%" is always % by weight):

EXAMPLE 1

Unsubstituted γ-quinacridone is prepared in accordance with Example 1 of U.S. Pat. No. 5,840,901, but without drying after washing with warm water. Using water, a portion of the wet press cake containing 33.33 g of quinacridone is flushed into a storage vessel and slurried (total weight of the suspension: 400 g). 2,9-Dichloro-quinacridone is prepared in accordance with Example 3 of U.S. Pat. No. 5,840,901, but without drying after washing with warm water. Using water, a portion of the wet press cake containing 66.67 g of 2,9-dichloroquinacridone is flushed into a storage vessel and slurried (total weight of the suspension: 600 g). Both storage vessels are heated to 35° C. The γ-quinacridone is then passed, via a cylindrical wet mill (volume corresponding to 24 parts by weight of water), filled to about 80% of its volume with mixed zirconium oxide grinding elements from 0.3 to 0.4 mm in diameter, at a radial speed of 10 m·s$^{-1}$, into the 2,9-dichloroquinacridone suspension, and the mixture is passed back and forth between the two storage vessels in a shuttle mode of operation for 1 hour. The first storage vessel is then rinsed with 120 g of N-methylpyrrolidone and a circulating mode of operation is carried out using the second storage vessel for a further 1 hour at a radial speed of 13.5 m·s$^{-1}$ and a temperature of 95° C. The radial speed is then reduced to 4.0 m·s$^{-1}$ and the suspension is ground for a further 1 hour in circulating mode. The product is then filtered and washed and dried in customary manner. A quinacridone solid solution pigment having a narrow particle size distribution and excellent application properties is obtained.

EXAMPLE 2

A mixture of 750 g crude 2,9-dichloroquinacridone and 250 g crude unsubstituted quinacridone (both obtained as coarse particles of specific surface area about 10 m$^2$/g by oxydation of the corresponding 6,11-dihydroquinacridones) are stirred in 1020 g of water for 2 hours and then, analogously to Example 1 above, transferred to a storage vessel using 60 g of N-methylpyrrolidone and heated to 70° C. The suspension is circulated through a cylindrical wet mill (volume 460 cm$^3$), filled to about 85% of its volume with yttrium-stabilised mixed zirconium oxide grinding elements from 0.3 to 0.4 mm in diameter, at a radial speed of 12 m·s$^{-1}$ (speed of rotation 3000 rpm) and a nominal power output of 0.50 kj·s$^{-1}$ for 6 hours at constant temperature. The nominal power output is reduced to 0.1 kj·s$^{-1}$ (speed of rotation 1800 rpm) and the temperature is lowered to 25° C. over the course of 1 hour. The suspension is filtered under suction and washed twice, using 2.0 kg of water each time; the product is dried at 80° C./2·10$^3$ Pa. A fine, strongly coloured quinacridone solid solution pigment having a narrow particle size distribution and excellent application properties is obtained.

EXAMPLE 3

A wet press cake of 1,4-diketo-2,5-dihydro-3,6-di(4-tert.-butyl-phenyl)-pyrrolo[3,4c]pyrrole containing 180 g of dry pigment is flushed and slurried with water into a storage vessel (total weight of the suspension: 1660 g). In a second storage vessel, a wet press cake of 1,4-diketo-2,5-dihydro-3,6-di(4-chloro-phenyl)-pyrrolo[3,4c]pyrrole containing 270 g of dry pigment is flushed and slurried with water (total weight of the suspension 2490 g). The contents of both storage vessels (totally 4150 g, 10.8 weight-% solids) are mixed together and the mixed suspension is then passed into an empty vessel, via a cylindrical wet mill, filled to about 80% of its volume with mixed zirconium oxide grinding elements from 0.3 to 0.4 mm in diameter, at a radial speed of 10 m·s$^{-1}$. Then, the mixture is passed back and forth between the two storage vessels in a shuttle mode of operation for 1 hour. The first storage vessel is then rinsed with 100 g of water and the process is carried on in a circulating mode of operation using only the second storage vessel for further 4 hours at a radial speed of 13.5 m·s$^{-1}$ and a temperature of 30° C. At the end of the milling, the mill is rinsed out with 300 g of water and the rinsing water is added to the mixed crystal pigment dispersion. For ripening the pigment, 350 g of 1-butanol are then added to the suspension and the temperature is kept at 92° C. for 1 hour. The product is finally filtered, washed and dried in customary manner. A mixed crystal diketopyrrolopyrrole pigment having a narrow particle size distribution and excellent application properties is obtained.

EXAMPLE 4

The procedure is analogous to Example 3, but the ripening with butanol is omitted. Alternatively, the ripening conditions can also be varied within very large limits (for example the ripening temperature and/or time such as disclosed in the following examples) depending on the desired final particle size.

EXAMPLE 5

The procedure is analogous to Example 3, but the ripening time is decreased to only 0.5 hour. A pigment of smaller particle size and increased transparency is obtained.

EXAMPLE 6

The procedure is analogous to Example 3, but the ripening time is increased to 4 hours. A pigment of bigger particle size and increased opacity is obtained.

EXAMPLE 7

The procedure is analogous to Example 3, but the ripening temperature is decreased to 40° C. A pigment of smaller particle size and increased transparency is obtained.

EXAMPLE 8

The procedure is analogous to Example 3, but the ripening temperature is increased to 115° C. (using a pressure-proofed closed equipment). A pigment of bigger particle size and superior opacity is obtained.

EXAMPLE 9

Unsubstituted γ-quinacridone is prepared in accordance with Example 1 of U.S. Pat. No. 5,840,901, but without drying after washing with warm water. Using water, a portion of the wet press cake containing 33.33 g of quinacridone is flushed into a storage vessel and slurried (total weight of the suspension: 400 g). 2,9-Dichloro-quinacridone is prepared in accordance with Example 3 of U.S. Pat. No. 5,840,901, but without drying after washing with warm water. Using water, a portion of the wet press cake containing 66.67 g of 2,9-dichloroquinacridone is flushed into a storage vessel and slurried (total weight of the suspension: 600 g). Both storage vessels are heated to 35° C. The γ-quinacridone is then passed, via a cylindrical wet mill (volume corresponding to 24 parts by weight of water), filled to about 80% of its volume with mixed zirconium oxide grinding elements from 0.3 to 0.4 mm in diameter, at a radial speed of 10 m·s$^{-1}$, into the 2,9-dichloroquinacridone suspension. Afterwards, the first storage vessel is then rinsed with 500 g of water and a circulating mode of operation is carried out using the second storage vessel for further 4 hours at a radial speed of 13.5 m·s$^{-1}$ and a temperature of 35° C. The radial speed is then reduced to 4.0 m·s$^{-1}$ and the suspension is further ground for 1 hour in circulating mode at a temperature of 95° C. The product is then filtered and washed and dried in customary manner. A quinacridone solid solution pigment having a narrow particle size distribution and excellent application properties is obtained.

EXAMPLE 10

The pigment according to Example 1 is incorporated into an automotive polyester/CAB enamel paint system.

(a) Binder solution (8.2% binder):

| | |
|---|---|
| 41.0 | CAB ® 531.1 (Eastman Chem.), 20% cellulose acetobutyrate in butyl acetate/xylene 2:1 |
| 1.5 | NUODEX ® 6 (zirkonium octoate, Nordmann, Rassmann, D-Hamburg) |
| 18.5 | Solvesso ® 150 (Exxon) |
| 21.5 | butyl acetate |
| 17.5 | xylene |

(b) Millbase Formulation:

A 250 ml jar is charged with 15.73 g Dynapol® H 700–08 (Degussa-Hüls), 11.80 g of the freshly prepared binder solution from (a), 11.80 g Maprenal® MF 650 (Vianova Resins) and 2.67 g dispersant Disperbyk® 161 (BYK Chemie). 8 g pigment according to Example 1 and 100 g of glass beads are added. The mixture in the jar is shaken on a Skandex shaker for 1 hour. The millbase contains 16.0% pigment with a pigment/binder ratio of 1:2.25 and a solids (pigment+binder) content of 59%.

(c) Masstone Color for an PES/CAB Enamel Drawdown:

23.75 g of the millbase from (b), 10.50 g of Dynapol® H 700-08, 7.87 g of the binder solution from (a) and 7.87 g Maprenal® MF 650 are mixed, yielding a resin/pigment dispersion with a concentration of 7.6% pigment in a pigment to binder ratio of 1:5.22 and a solid (pigment+binder) content of 47,3%.

(d) Coating:

The resin/pigment dispersion is drawn down onto a Leneta black and white chart from the Leneta Company using a 100 μm wet film applicator. The film is flashed in a flash cabinet for 30 minutes and then "baked" in an oven at 130° C. for 30 minutes. The final thickness of the coating is 28 μm.

(e) Colour Measurement:

The C.I.E. L*, C*, h color space values are obtained from the portion over white background using a $D_{65}$ illuminant and 10° observer with a specular component included.

EXAMPLES 11–18

The procedure is analogous to Example 10 (a)–(e), but the pigment of Example 1 is replaced by the pigments of Examples 2–9.

Instead of a masstone, it is also possible to make metallic or goniochromatic, optionally two-coat coatings with excellent results, in particular when using instant pigments of high transparency.

What is claimed is:

1. A method for the preparation of a conditioned organic pigment comprising at least a first component selected from the group consisting of 4,4'-diamino-1,1'-dianthraquinonyls, diketo-pyrrolo[3,4-c]pyrroles, triphenedioxazines, indanthrones, perylenes, phthalocyanines and quinacridones, and a second component forming a solid solution or a mixed crystal with the first component, the molar ratio of the first component to the second component in the solid solution or mixed crystal being greater or equal to 1, wherein (1) a pigment suspension of the first component and a pigment suspension of the second component are each formed independently from the other in a liquid reaction medium;

(2) the pigment suspension of the first component and the pigment suspension of the second component from step (1) are either separately transferred into separate storage vessels or both pigment suspensions are transferred into a storage vessel;

(3) if the liquid medium of the pigment suspension in one or both storage vessels does not already consist of water and optionally an organic liquid in which the amount of organic liquid is from 0 to 50% by weight, based on the total amount of organic liquid and water, the composition of the pigment suspension is so modified by means of the addition of water that the amount of organic liquid is from 0 to 50% by weight, based on the total amount of organic liquid and water; and/or optionally organic liquid is added in such quantity that its total amount does not exceed 50% by weight, based on the total amount of organic liquid and water;

(4) the pigment suspension from the storage vessel containing the first component and the pigment suspension from the storage vessel containing the second component, or alternately the suspension from the storage vessel containing both pigment suspensions of step (1), are passed a number of times through an agitated media pearl mill in a circulating or shuttle mode of operation, the agitated media pearl mill having a smaller chamber volume than the volume of the pigment suspension and being operated at a specific power density of at most 2.0 kJ·s$^{-1}$ per liter of grinding space, whereby in case of more than one storage vessel the flow between the storage vessels and the pearl mill controlled in such a way that the contents of all storage vessels are mixed together at any stage up to before a last pass in the pearl mill; whereby the first component and the second component combine to form a solid solution or a mixed crystal; and (5) optionally, the pigment is isolated by removing the liquid surrounding it.

2. A method for the preparation of a conditioned pigment according to claim 1, wherein the second component is selected from the group consisting of the 1-aminoanthraquinones, anthanthrones, anthrapyrimidines, azos, azomethines, dioxazines, diketopyrrolopyrroles, flavanthrones, indanthrones, isoindolines, isoindolinones, isoviolanthrones, perinones, perylenes, phthalocyanines, pyranthrones, quinacridones, quinacridonequinones, quinophthalones and thioindigos.

3. A method for the preparation of a conditioned pigment according to claim 1, wherein the first component is selected from the group consisting of quinacridones, perylenes and diketo[3,4-c]pyrrolopyrroles.

4. A method according to claim 1, wherein the first component and the second component are both 4,4'-diamino-1,1'-dianthraquinonyls, both diketopyrrolo[3,4-c]pyrroles, both triphene-dioxazines, both indanthrones, both perylenes, both phthalocyanines or both quinacridones.

5. A method according to claim 1, comprising two quinacridones or a quinacridone and a diketopyrrolo[3,4-c]pyrrole.

6. A method according to claim 1, wherein the organic liquid is neutral and comprises oxygen in its molecule.

7. A method according to claim 1, wherein the organic liquid has a dipole moment μ of 2.8–6.0·10$^{-18}$ esu.

8. A method according to claim 1, wherein the organic liquid is selected from the group consisting of acetamide, formamide, methylacetamide, methylformamide, caprolactam, valerolactam, 1,1,2,2-tetramethylurea, dimethyl sulfoxide, sulfolane, nitromethane, nitrobenzene, acetonitrile, methanol, ethylene carbonate, dimethylacetamide, dimethylformamide and N-methylpyrrolidone, or is a mixture of a plurality of organic liquids, the overall polarity of which lies in the range of 2.8–6.0·10$^{-18}$ esu.

9. A method according to claim 1, wherein the amount of organic liquid is from 1 to 30% by weight, based on the total amount of organic liquid and water.

10. A method according to claim 1, wherein the amount of organic liquid is from 0 to 3% by weight of liquid, based on the total amount of organic liquid and water.

11. A method according to claim 1, wherein the temperature of the suspension in the pearl mill is at the beginning of step (4) from 10 to 50° C. and at the end of step (4) from 30 to 100° C.

12. A method according to claim 1, wherein an additional substance selected from the group consisting of acids, bases, resins, growth inhibitors, phase directors, dispersing agents and wetting agents is added in any step (1), (2), (3), or (4).

13. A method according to claim 1, wherein a total treatment period in the agitated media pearl mill is from 10 to 600 minutes.

14. A method according to claim 13, wherein after two-third of the total treatment period, the agitated pearl mill is adjusted to a radial speed value of at most 11 m·s$^{-1}$.

15. A method according to claim 1, wherein the pigment obtained in step (5) consists of at least 90% by weight of particles having a size of $\bar{L}\pm\frac{1}{2}\bar{L}$, wherein the average particle size $\bar{L}$ is from 0.01 to 3 μm.

16. A method according to claim 1, wherein the pigment obtained in step (5) is hiding and leads to a color difference ΔE* less or equal to 15, measured in a 25±5 μm thick acrylic or polyester enamel coating system having a pigment to binder weight ratio of 0.18 over a black and white background.

17. A method according to claim 1, wherein the pigment obtained in step (5) is transparent and has a particle size of 0.001–0.3 μm.

18. A method according to claim 5, wherein the two quinacridones or a quinacridone and a diketdpyrrolo[3,4-c] pyrrole are selected from the following pairs: unsubstituted quinacridone and 2,9-dichloroquinacridone; unsubstituted quinacridone and 3,6-diphenyl-2,5-dihydro-pyrrolo-[3,4-c] pyrrole-1,4-dione; unsubstituted quinacridone and 3,6-di(4'-chloro-phenyl)-2,5-dihydro-pyrrolo-[3,4-c]pyrrole-1,4-dione; 2,9-dichloroquinacridone and 3,6-diphenyl-2,5-dihydro-pyrrolo[3,4-c]pyrrole-1,4-dione; 2,9-dichloroquinacridone and 3,6-di(4'-chloro-phenyl)-2,5-dihydro-pyrrolo[3,4-c]pyrrole-1,4-dione; 3,6-diphenyl-2,5-dihydro-pyrrolo[3,4-c]pyrrole-1,4-dione and 3,6-di(4'-chloro-phenyl)-2,5-dihydro-pyrrolo[3,4-c]pyrrole-1,4-dione.

19. A method according to claim 10, wherein the organic liquid and water is at a pH in the range of from 9–11.

20. A method according to claim 16, wherein the pigment obtained in step (5) is hiding and leads to a color difference ΔE* less or equal to 10, measured in a 25±5 μm thick acrylic or polyester enamel coating system having a pigment to binder weight ratio of 0.18 over a black and white background.

21. A method for the preparation of a conditioned organic pigment according to claim 1, wherein the concentration of pigment in any of the pigment suspensions is increased between steps (1) and (2) and/or between steps (4) and (5) by removing part of the liquid medium.

22. A method for the preparation of a conditioned organic pigment according to claim 21, wherein a washing agent is added once or more than once before the concentration of pigment in a pigment suspension is increased by removing part of the liquid medium.

23. A method for the preparation of a conditioned organic pigment according to claim 1, wherein in step (2) the pigment is kept substantially wetted with liquid reaction medium, organic liquid and/or water all the time.

24. A method for the preparation of a conditioned organic pigment according to claim 1, wherein in step (2) a pigment suspension is dried to obtain a pigment having a specific surface area of from 1 to 25 m²/g and comprising a residual amount of water or an organic liquid of from 0.1 to 20% by weight, which pigment is transferred into the storage vessel.

25. A method according to claim 8, wherein the organic liquid comprises dimethyl sulfoxide (DMSO), dimethylformamide (DMF) or N-methylpyrrolidone (NMP).

26. A method according to claim 14, wherein after two-third of the total treatment period, the radial speed of the agitated media pearl mill is adjusted to a value of from 1 to 8 m·s⁻¹.

27. A method according to claim 15, wherein the pigment obtained in step (5) consists of at least 90% by weight of particles having a size of $\bar{L}\pm\frac{1}{2}\bar{L}$, wherein the average particle size $\bar{L}$ is from 0.05 to 2 μm.

28. A method according to claim 15, wherein the pigment obtained in step (5) consists of at least 80% by weight of particles having a size of $\bar{L}\pm\frac{1}{4}\bar{L}$.

29. A method according to claim 18, wherein the two quinacridones or a quinacridone and a diketopyrrolo[3,4-c]pyrrole are selected from the following pairs: unsubstituted quinacridone and 2,9-dichloroquinacridone; unsubstituted quinacridone and 3,6-diphenyl-2,5-dihydro-pyrrolo-[3,4-c]pyrrole-1,4-dione; 2,9-dichloroquinacridone and 3,6-di(4'-chloro-phenyl)-2,5-dihydro-pyrrolo-[3,4-c]pyrrole-1,4-dione.

30. A method according to claim 1, wherein the first component and the second component are each independently selected from the group consisting of 4,4'-diamino-1,1'-dianthraquinonyls, diketopyrrolo[3,4-c]pyrroles, perylenes, and quinacridones;

the organic liquid of step (3) is present, or is modified to be present, in the amount of from 3 to 20% by weight, based on the total amount of organic liquid and water, and is selected from the group consisting of dimethyl sulfoxide, dimethylformamide and N-methylpyrrolidone, or is a mixture of a plurality of organic liquids, the overall polarity of which lies in the range of $3.3–5.5 \cdot 10^{-18}$ esu;

the temperature of the suspension in the pearl mill is at the beginning of step (4) from 15 to 45° C. and at the end of step (4) from 50 to 100° C.;

a total treatment period in the agitated media pearl mill is from 10 to 600 minutes;

wherein after two-third of the total treatment period, the agitated pearl mill is adjusted to a radial speed value of 1–8 m·s⁻¹;

the pigment obtained consists of at least 90% by weight of particles having a size of $\bar{L}\pm\frac{1}{2}\bar{L}$, and at least 80% by weight of particles having a size of $\bar{L}\pm\frac{1}{4}\bar{L}$ wherein the average particle size $\bar{L}$ is from 0.01 to 3 μm; and optionally, an additional substance selected from the group consisting of acids, bases, resins, growth inhibitors, phase directors, dispersing agents and wetting agents is added in any step (1), (2), (3), or (4).

31. A method according to claim 1, wherein the first component and the second component are each independently selected from the group consisting of diketopyrrolo[3,4-c]pyrroles, perylenes, and quinacridones;

the organic liquid of step (3) is present, or is modified to be present, in the amount of from 1 to 30% by weight, based on the total amount of organic liquid and water, and is selected from the group consisting of acetamide, formamide, methylacetamide, methylformamide, caprolactam, valerolactam, 1,1,2,2-tetramethylurea, sulfolane, nitromethane, nitrobenzene, acetonitrile, methanol, ethylene carbonate, dimethylacetamide, dimethyl sulfoxide, dimethylformamide and N-methylpyrrolidone, or is a mixture of a plurality of organic liquids, the overall polarity of which lies in the range of $2.8–6.0 \cdot 10^{-18}$ esu;

the temperature of the suspension in the pearl mill is at the beginning of step (4) from 15 to 45° C. and at the end of step (4) from 50 to 100° C.;

a total treatment period in the agitated media pearl mill is from 20 to 200 minutes;

wherein after two-third of the total treatment period, the agitated pearl mill is adjusted to a radial speed value of 1–8 m·s⁻¹;

the pigment obtained consists of at least 90% by weight of particles having a size of $\bar{L}\pm\frac{1}{2}\bar{L}$ and at least 80% by weight of particles having a size of $\bar{L}\pm\frac{1}{4}\bar{L}$ wherein the average particle size $\bar{L}$ is from 0.05 to 2 μm; and optionally, an additional substance selected from the group consisting of acids, bases, resins, growth inhibitors, phase directors, dispersing agents and wetting agents is added in any step (1), (2), (3), or (4).

32. A method according to claim 7, wherein the organic liquid has a dipole moment μ of $3.8–5.5 \cdot 10^{-18}$ esu.

33. A method according to claim 8, wherein the organic liquid is from 5–10% by weight based on the total amount of organic liquid and water, comprises N-methylpyrrolidone (NMP) and the pH is in the range of from 9 to 11.

34. A method according to claim 7, wherein the temperature of the suspension in the pearl mill is at the beginning of step (4) from 15 to 45° C. and at the end of step (4) from 50 to 100° C.

35. A method according to claim 9, wherein the amount of organic liquid is from 3 to 20% by weight, based on the total amount of organic liquid and water.

* * * * *